Aug. 16, 1927.

F. A. NAUTS 1,638,871

SCOOTER

Filed April 19, 1926

INVENTOR.
Frank A. Nauts.
BY
ATTORNEYS.

Patented Aug. 16, 1927.

1,638,871

UNITED STATES PATENT OFFICE.

FRANK A. NAUTS, OF TOLEDO, OHIO, ASSIGNOR TO GENDRON WHEEL COMPANY, OF TOLEDO, OHIO, A CORPORATION OF OHIO.

SCOOTER.

Application filed April 19, 1926. Serial No. 103,029.

The application relates to children's vehicles and more particularly to the type of two wheel vehicle known as a scooter.

One of the objects of my invention is to provide an improved brake for the vehicle operated by a controlling lever on the steering post.

Another object is to provide an improved construction of brake operating mechanism which permits swiveling of the steering post without interference with the brake.

A further object is to provide an improved brake shoe form engaging the tire of the vehicle wheel.

These and other objects are attained by providing the novel construction hereinafter set forth.

Figures 1, 2, 3:
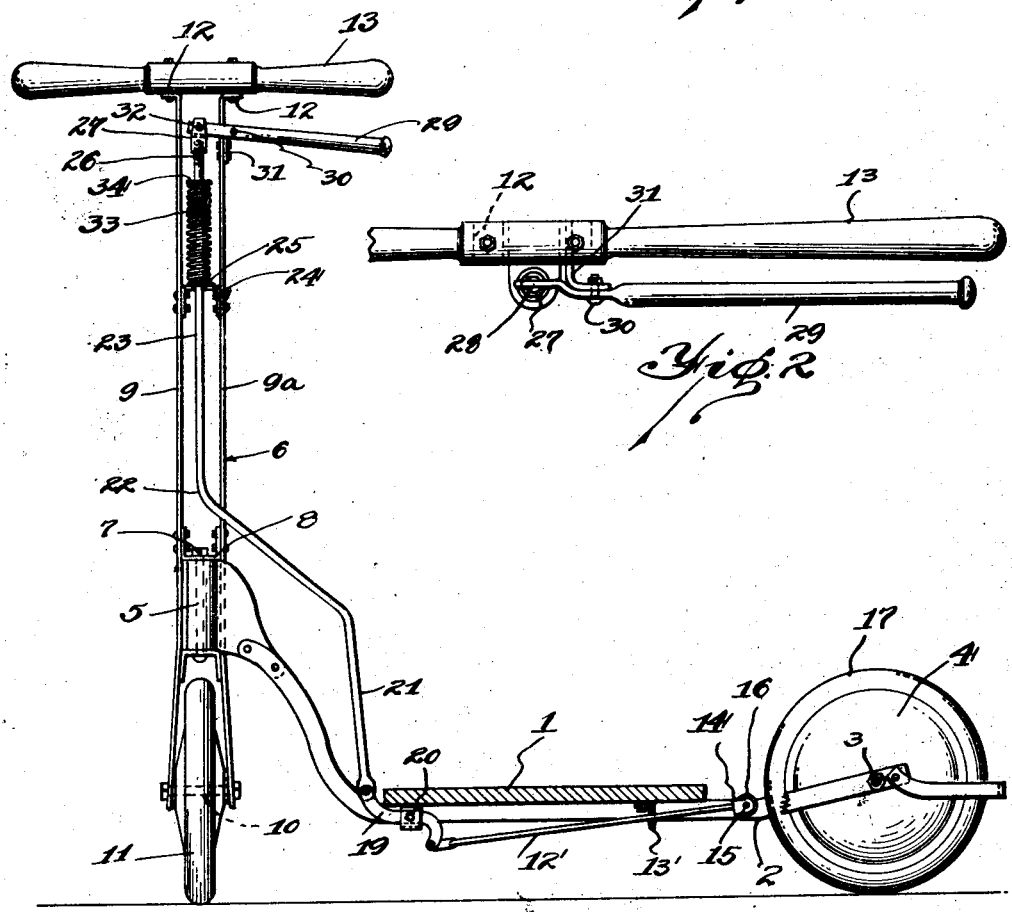
Figure 1 is a side elevation of the vehicle with the steering post turned on its supporting pivot.
Figure 2 is a top view of the steering post handle showing the brake lever adjacent thereto.
Figure 3 is a detailed view showing the improved brake shoe engaging the wheel.

The child's vehicle to which my improved brake construction is applied is similar to that disclosed in my co-pending application Serial No. 737,810, filed Sept. 15, 1904. Briefly described this vehicle which is ordinarily termed a scooter comprises a platform 1 mounted on a frame 2 carrying at its rear end the axle 3 and rear wheel 4 and at its front end extending upwardly and being provided with a pivot bearing 5. 6 is a steering post pivotally connected to the frame by the king bolt 7 which passes through the ears 8 on the steering post and the pivot bearing 5. The steering post is formed of two strips 9 and 9ª which carry at their lower ends the front axle 10 and the front wheel 11 and their upper ends are laterally bent at 12 to receive the handle 13. The steering post extends upward in a substantially vertical direction but is preferably inclined slightly, the inclination being determined by the angle of the pivot bearing 5.

The brake of the vehicle comprises a rod 12 extending longitudinally of the frame beneath the platform 1 and held from lateral movement by the apertured bracket 13 depending from the platform. At the rear end of the rod 12 is mounted a U shaped bracket 14 having a pin 15 extending transversely to the rod for receiving the roller 16. This roller is preferably shaped to correspond with the curvature of the wheel which it engages and in the preferred form on the vehicle where the wheels are provided with rubber tires 17 of substantially circular cross section, the roller 16 is provided with a concave outer surface corresponding to the curvature of the tire. The roller is preferably of slightly greater length than the diameter of the tire and is therefore provided with the cylinder end portions 18 projecting beyond the concave curved portion.

For moving the brake rod 12 longitudinally into and out of engagement with the wheels there is a bell crank lever 19 pivoted on a bracket 20 at the forward end of the platform, this lever being pivotally connected at one end to the rod 12. The other end of the bell crank is pivotally connected to the operating rod 21, which extends upwardly therefrom at an angle and is bent at 22 to form a straight portion 23 extending in alignment with the axis of the pivot bearing 5. For supporting the rod 20 there is a bracket 24 secured to the steering post and projecting laterally thereof. This bracket has the elongated aperture 25 therein through which the straight portion 23 of the rod is slidable.

The upper end of the rod 23 is threaded at 26 for receiving a threaded thimble 27, the upper end of which is slotted at 28. 29 is the controlling lever fulcrumed on the steering post by means of the pin 30 engaging a bracket 31. One end of this lever is inserted in the slot 28 and pivotally secured to the thimble by a pin 32. This end of the lever is also off set slightly from the portion engaging the bracket 31 so as to be in direct alignment with the pivot bearing 5. The other end of the lever 29 forms the operating handle and extends in substantially the same direction as the steering post handle 13. 33 is a coil spring surrounding the rod 32 and arranged between the collar 34 on said rod and the bracket 24.

The brake mechanism is normally held inoperative by reason of the spring 33 bearing upwardly on the rod 32, thus retracting the brake roller 16 from the wheel. For operating the brake the handle of the lever 29 is moved upwardly and by reason of the arrangement of the lever in close proximity to the handle of the steering post the brake may be operated without removing the hand from the steering post handle. The straight portion 23 of the rod 21 is thus moved downwardly which causes the roller 16 to engage the tire of the rear wheel.

The advantage of the roller construction of the brake shoe is that it lessens the wearing of the tire and the wheel due to the rolling contact of the tire and roller. The brake, however is very effective since the roller is forced into the yielding material of the tire thus introducing considerable friction.

One of the features of the brake construction is the arrangement of the thimble in alignment with the axis of the steering pivot so that during the steering movement of the steering post the thimble can rotate relative to the rod 23 without any lateral movement of the brake rods. This is due to the swiveling connection of the thimble and rod which as specifically shown is a threaded engagement. Another advantage of this construction is that the brake may be adjusted by adjusting the thimble on the threaded rod.

What I claim as my invention is:

1. In a child's vehicle, the combination with a frame, a steering post pivotally mounted on said frame, a wheel carried by said steering post, and a second wheel carried by said frame, of a brake shoe engageable with one of said wheels, a rod operatively connected to said brake shoe and slidably supported on said steering post and a lever fulcrumed on said steering post and pivotally connected to said rod in alignment with the pivotal mounting of said steering post.

2. In a child's vehicle, the combination with a frame, a steering post pivotally mounted on said frame, a wheel carried by said steering post, a second wheel carried by said frame, a brake shoe engageable with the second mentioned wheel, a rod operatively connected to said brake shoe and slidably supported on said steering post, said rod having the upper portion thereof extending in axial alignment with the pivotal mounting of said steering post, a thimble rotatively engaging the upper end of said rod, and a lever fulcrumed on said steering post and pivotally connected to said thimble.

3. In a child's vehicle, the combination with a frame, a steering post pivotally mounted on said frame, a wheel carried by said steering post, a second wheel carried by said frame, a brake shoe engageable with the second mentioned wheel, a rod operatively connected to said brake shoe and slidably supported on said steering post, said rod having the upper portion thereof extending in axial alignment with the pivotal mounting of said steering post, a thimble threadedly engaging the upper end of said rod, and a lever fulcrumed on said steering post and connected to said thimble.

4. In a scooter the combination with a frame having a platform thereon, a rear supporting wheel mounted on said frame, a steering post pivotally connected to said frame, a front supporting wheel mounted on said steering post, a brake shoe movable longitudinally of said frame for engaging said rear wheel, a bell crank lever mounted on said platform having one arm connected to said brake shoe, a rod slidably mounted on said steering post having a straight upper portion in alignment with the steering post pivot and a laterally bent portion connected to said bell crank lever, a handle extending transversely of said steering post, a lever fulcrumed on said steering post adjacent said handle, a thimble threadedly engaging the upper end of said rod and provided with a slotted end for receiving said lever and a pin connecting said thimble and lever.

In testimony whereof I affix my signature.

FRANK A. NAUTS.